(12) United States Patent
Hou et al.

(10) Patent No.: US 11,099,725 B2
(45) Date of Patent: Aug. 24, 2021

(54) USER INTERFACE TOOLS FOR VISUAL EXPLORATION OF MULTI-DIMENSIONAL DATA

(71) Applicant: MICROSOFT TECHNOLOGY LICENSING, LLC, Redmond, WA (US)

(72) Inventors: Zhitao Hou, Redmond, WA (US); Haidong Zhang, Redmond, WA (US); Dongmei Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 336 days.

(21) Appl. No.: 15/746,798

(22) PCT Filed: Jul. 15, 2016

(86) PCT No.: PCT/US2016/042373
§ 371 (c)(1),
(2) Date: Jan. 22, 2018

(87) PCT Pub. No.: WO2017/015068
PCT Pub. Date: Jan. 26, 2017

(65) Prior Publication Data
US 2020/0081610 A1 Mar. 12, 2020

(30) Foreign Application Priority Data
Jul. 23, 2015 (CN) .......................... 201510438292.1

(51) Int. Cl.
*G06F 3/0484* (2013.01)
*G06F 16/26* (2019.01)
(Continued)

(52) U.S. Cl.
CPC ........ *G06F 3/04847* (2013.01); *G06F 3/0482* (2013.01); *G06F 3/04845* (2013.01);
(Continued)

(58) Field of Classification Search
CPC ............... G06F 3/04847; G06F 3/0482; G06F 3/04845; G06F 16/26; G06F 16/283; G06T 11/206
See application file for complete search history.

(56) References Cited

U.S. PATENT DOCUMENTS 8,140,586 B2 3/2012 Stolte et al.
8,583,678 B2 11/2013 Vainer et al.
(Continued)

FOREIGN PATENT DOCUMENTS

CN 101908056 A 12/2010

OTHER PUBLICATIONS

"First Office Action and Search Report Issued in Chinese Patent Application No. 201510438292.1", dated Mar. 29, 2019, 16 Pages.
(Continued)

*Primary Examiner* — Seth A Silverman

(57) ABSTRACT

A computing device running a tool for visually exploring datasets receives a request for a dataset comprising a plurality of subspaces of a multi-dimensional data structure and in response to receiving a user selection of a data point associated with the dataset, presents a visualization of the calculations associated with the selected data point. The tool allows the user to select one of the calculations, thus causing presentation of a visualization of the selected calculation. A semantic graphical feature is incorporated into the visualization of the selected calculation depending upon a type of the calculation.

20 Claims, 10 Drawing Sheets

(51) Int. Cl.
*G06F 16/28* (2019.01)
*G06F 3/0482* (2013.01)
*G06T 11/20* (2006.01)

(52) U.S. Cl.
CPC ............ *G06F 16/26* (2019.01); *G06F 16/283* (2019.01); *G06T 11/206* (2013.01)

(56) References Cited

U.S. PATENT DOCUMENTS

| | | | |
|---|---|---|---|
| 8,996,978 | B2 | 3/2015 | Richstein et al. |
| 2005/0033782 | A1* | 2/2005 | de Brebisson ........ G06F 15/025 708/160 |
| 2005/0039170 | A1* | 2/2005 | Cifra ......................... G06F 8/34 717/125 |
| 2013/0185624 | A1 | 7/2013 | Appleyard et al. |
| 2013/0282696 | A1 | 10/2013 | John et al. |
| 2014/0053091 | A1 | 2/2014 | Hou et al. |
| 2014/0082540 | A1 | 3/2014 | Armitage |
| 2014/0108380 | A1 | 4/2014 | Gotz et al. |
| 2014/0282184 | A1* | 9/2014 | Dewan .................. G06F 3/0484 715/771 |

OTHER PUBLICATIONS

Anonymous, "SAP Business Objects Analysis edition for OLAP User Guide.", Retrieved from: https://help.sap.com/doc/businessobject_product_guides_sbo41_en_sbo41sp2_aolap_user_en_pdf/4.1/en-US/sbo41sp2_aolap_user_en.pdf, Apr. 3, 2014, 222 Pages.

Ferguson, Mike, "Interactive Data Exploration With an In-Memory Analytics Engine.Interactive Data Exploration With an In-Memory Analytics Engine.", In White Paper of Qlik, May 1, 2015, 17 Pages.

Oracle, "Exploiting the power of Oracle using Microsoft Excel", Retrieved from: http://www.oracle.com/technetwork/middleware/bi-spreadsheet-addin-wp-1-133663.pdf, Dec. 1, 2004, 23 Pages.

"International Search Report and the Written Opinion Issued in PCT Application No. PCT/US2016/042373", dated Oct. 7, 2016, 15 Pages.

"Second Written Opinion Issued in PCT Application No. PCT/US2016/042373", dated Mar. 21, 2017, 6 Pages.

"SAP Helps Redefine the Art of the Possible in Analytics", Retrieved from: https://www.prnewswire.com/news-releases/sap-helps-redefine-the-art-of-the-possible-in-analytics-222970231.html, Sep. 9, 2013, 5 Pages.

"Manage prompts in a workspace: Analysis OLAP 4.1", Retrieved From: https://www.youtube.com/watch?=VCou79kpsOs, Jul. 22, 2013, 1 Page.

"What's new in SAP BusinessObjects Analysis, edition for OLAP 4.1", Retrieved From: https://www.youtube.com/watch?v=XRF8jYpP4mo, Jun. 12, 2013, pp. 1-1.

"Office action Issued in European Patent Application No. 16745004.8", dated Apr. 30, 2019, 9 Pages.

"Second Office Action Issued in Chinese Patent Application No. 201510438292.1", dated Sep. 29, 2019, 12 Pages.

"Summons to Attend Oral Proceedings Issued in European Patent Application No. 16745004.8", dated Feb. 14, 2020, 7 Pages.

"Office Action Issued in Chinese Patent Application No. 201510438292.1", dated Jan. 22, 2020, 8 Pages.

"Create reports—eazyBI—Documentation", Retrieved From: https://docs.eazybi.com/eazybi/analyze-and-visualize/create-reports. Aug. 7, 2013, 14 Pages.

"Qlik Sense", Retrieved From: https://web.archive.org/web/20150209021031/http://www.qlik.com/us/explore/products/sense?ga-link=hero, Feb. 9, 2015, 5 Pages.

"Sisense", Retrieved From: https://web.archive.org/web/20150319100003/https://www.getapp.com/business-intelligence-analytics-software/a/sisense-prism/, Mar. 19, 2015, 11 Pages.

Derthick, et al., "An Interactive Visualization Environment for Data Exploration", In Proceedings of the 3rd International Conference on Knowledge Discovery and Data Mining, Aug. 14, 1997, pp. 2-9.

Elias, et al., "Exploration Views: Understanding Dashboard Creation and Customization for Visulization Novices", In Proceedings of the 13th IFIP TC 13 International Conference on Human-computer Interaction—vol. Part IV, Sep. 5, 2011, pp. 274-291.

Heer, et al., "Interactive Dynamics for Visual Analysis", In ACM Queue, vol. 10, Issue 2, Feb. 1, 2012, pp. 1-26.

* cited by examiner

USER INTERFACE TOOLS FOR VISUAL EXPLORATION OF MULTI-DIMENSIONAL DATA

CROSS-REFERENCE TO RELATED APPLICATION

This application is a U.S. National Stage Application of PCT/US2016/042373, filed Jul. 15, 2016, which claims benefit of Chinese Patent Application No. 201510438292.1, filed Jul. 23, 2015, which applications are hereby incorporated by reference. To the extent appropriate, a claim of priority is made to each of the above disclosed applications.

BACKGROUND

When exploring relational data, it is common to use certain calculations to extend the data being explored to drive additional insights, such as calculating sales increase by month, calculating the share of sales in US market, calculating the rank of sales among all brands, etc. However, existing solutions are difficult to use and not intuitive. Users need to explicitly create corresponding derived measures in a data table beforehand, or manually specify the formulas to conduct the calculation during data exploration. This requires the user to possess specific knowledge of an expression schema of the underlying data. The existing solutions make further exploration on current calculations difficult, if not impossible. In addition, existing data presentations have limited presentation capabilities.

SUMMARY

Concepts and technologies are described herein for providing an interface for allowing a user to visualize calculations and comparisons of data of a dataset from a multi-dimensional data structure. Also, visualizations are created in response to a user selection of a calculation or of portions of a currently presented visualization. The interface also includes visualizations for imparting semantic knowledge about visualized calculations.

An example computing device that provides the interfacing capabilities includes a processor and a memory having computer-executable instructions stored thereupon. The computer-executable instructions, when executed by the processor, cause the computing device to access multi-dimensional data, present automatically-created calculations related to data subspaces within a dataset, present a visualization of a calculation in response to a selection performed at a user computing device, receive a user selection of graphical information included in a visualized calculation and present a new visualization of a chart in response to the selected graphical information.

In an example implementation, specific visualizations for different types of calculations are presented to highlight semantics of the corresponding calculation. The specific visualizations may include visualizations for difference, rank and percentage calculations, for example.

It should be appreciated that the above-described subject matter may also be implemented as a computer-controlled apparatus, a computer process, a computing system, or as an article of manufacture, such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The accompanying drawings, which are incorporated in and constitute a part of this disclosure, illustrate various example implementations. In the drawings.

DETAILED DESCRIPTION

Figure 1:
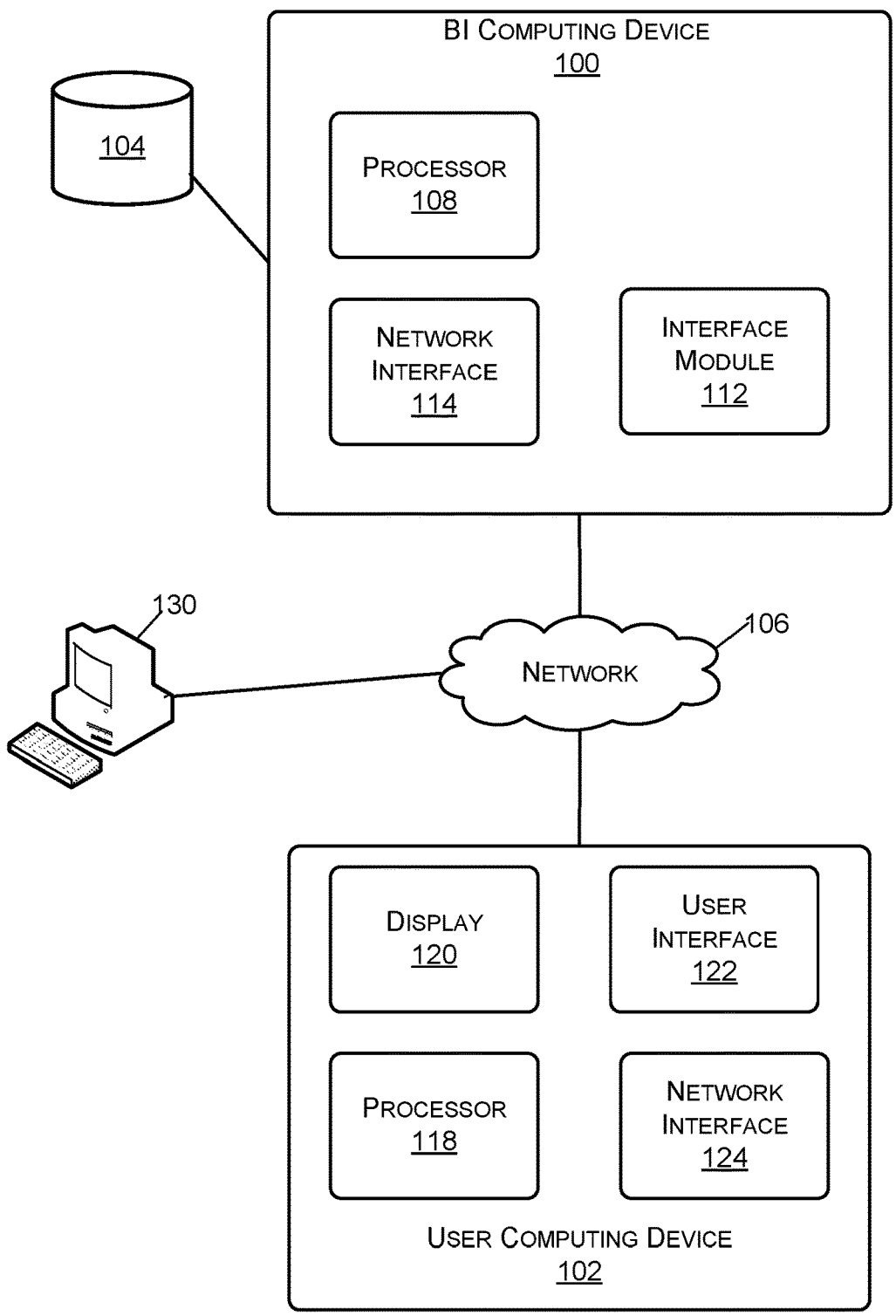
FIG. 1 is a block diagram of an example system for providing an interface of a dataset from multi-dimensional data.

Concepts and technologies are described herein for presenting an interactive interface for allowing users to interact with datasets associated with complex multi-dimensional data and to interact with calculations performed on portions of a dataset.

Overview

Current systems that provide visual interactions with datasets from multi-dimensional data do not provide easy ways to visually interact with data and/or calculations of the data of the datasets.

In an example computing device, a dataset having a plurality of subspaces of multi-dimensional data is retrieved from memory. The dataset is presented in a graphical user interface (GUI) at a user computing device, which allows a user to select a data point associated with the dataset. In response to the data point selection, calculations are performed on a value associated with the selected data point and a visualization of the calculations is presented in the GUI.

The computing device allows a user to select one of the calculations, which causes presentation of a visualization of the selected calculation. A semantic graphical feature is incorporated into the visualization of the selected calculation depending upon a type of the calculation.

Also, the computing device allows a user to alter a visualization of the selected calculation based on user selected dimension or measure limiters. The user may select a graphical element included in a visualization, which causes presentation of a new visualization corresponding to selected graphical element.

The following detailed description refers to the accompanying drawings. Wherever possible, the same reference numbers are used in the drawing and the following description to refer to the same or similar elements. While an implementation may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to the drawings, in which like numerals represent like elements, various embodiments will be described. FIG. 1 is a block diagram illustrating a system architecture with components for allowing user interaction with calculations of data points in charts and with data points in charts associated with a dataset(s) in a corpus of multi-dimensional data (i.e., multi-dimensional data structure). Each data point in a chart corresponds to a subspace of data in a dataset of the multi-dimensional data. The system architecture includes a business intelligence (BI) computing device 100 and a user computing device 102. The BI computing device 100 may be one of a variety of suitable computing devices described below with reference to FIG. 6. For example, the BI computing device 100 or the user computing device 102 may include a tablet computing device, a desktop computer, a mobile communication device, a laptop computer, a laptop/tablet hybrid computing device, a gaming device, or other type of computing device for performing a variety of tasks.

Multi-dimensional data is conceptually organized in a tabular format (i.e., multi-dimensional table) that includes a set of records as rows in the table, and each record is represented by a set of properties as columns in the table. The multi-dimensional data includes two types of columns—dimension and measure.

Dimensions represent basic and intrinsic properties of records in the table, e.g., "Brand" and "Year" for a car sales dataset. Dimensions are used to group and filter the records, based on equality and inequality of the dimension values. Dimensions fall into two major types according to their value domains—categorical and ordinal. Specifically, a categorical dimension takes categorical values (e.g., "Brand" for car sales), while an ordinal dimension takes ordinal values (e.g., "Year" for car sales).

Categorical and ordinal are used to categorize dimensions for characterizing their intrinsic ability to reflect ordering, but not to limit their usage scenarios. There may be ordinal dimensions with non-numerical values (e.g., an "Age" dimension could also take "Infants", "Children", "Teens", and etc. as values). When ordering is not an important aspect in the analysis task, ordinal dimensions may be used just as categorical dimensions.

For records, measures reflect attached and quantitative properties that are related to the analysis task (e.g., "Sales" and "Profit" for the car sales dataset). The values in measure columns are typically numerical values.

For a dataset, subspace is a concept representing a subset of records. Specifically, a subspace is defined by a set of <dimension:value> pairs as filtering constraint, and the subspace may contain exactly all the records that satisfy the filtering constraint in the given dataset. For a given dataset, there is a subspace with no filtering constraint in its definition, denoted as the subspace that includes all the records in the given dataset.

The BI computing device 100 may include a processor 108, a network interface 114 and an interface module 112. A data store 104 includes one or more multi-dimensional data structures. The data store 104 may be accessed by the BI computing device 100 via the network 106 or another network. The user computing device 102 may include a processor 118, a display device 120, a user interface 122 and a network interface 124. The network interfaces 114, 124 allow the respective computing devices to communicate with each other or other computing devices over the network 106, such as a public or private data network.

A user of the user computing device 102 may request access to a dataset of a multi-dimensional data structure stored in the data store 104. This request may be in the form of interaction with a graphical user interface (GUI), such as a webpage, produced by the processor 108 executing the interface module 112. A chart or table associated with the requested dataset is presented to the user via the display device 120. The presented chart or table includes a graphical component having elements (i.e., data points) linked to one or more subspaces of the requested dataset.

The type of chart or table that is presented is based on the type of data in the linked subspaces. After the user selects an element of the graphical component, calculations associated with the selected element are performed and the calculation results are presented to the user. The type of calculations performed is based on the type of chart or table presented. The interaction is described by examples in detail below.

Figure 2:
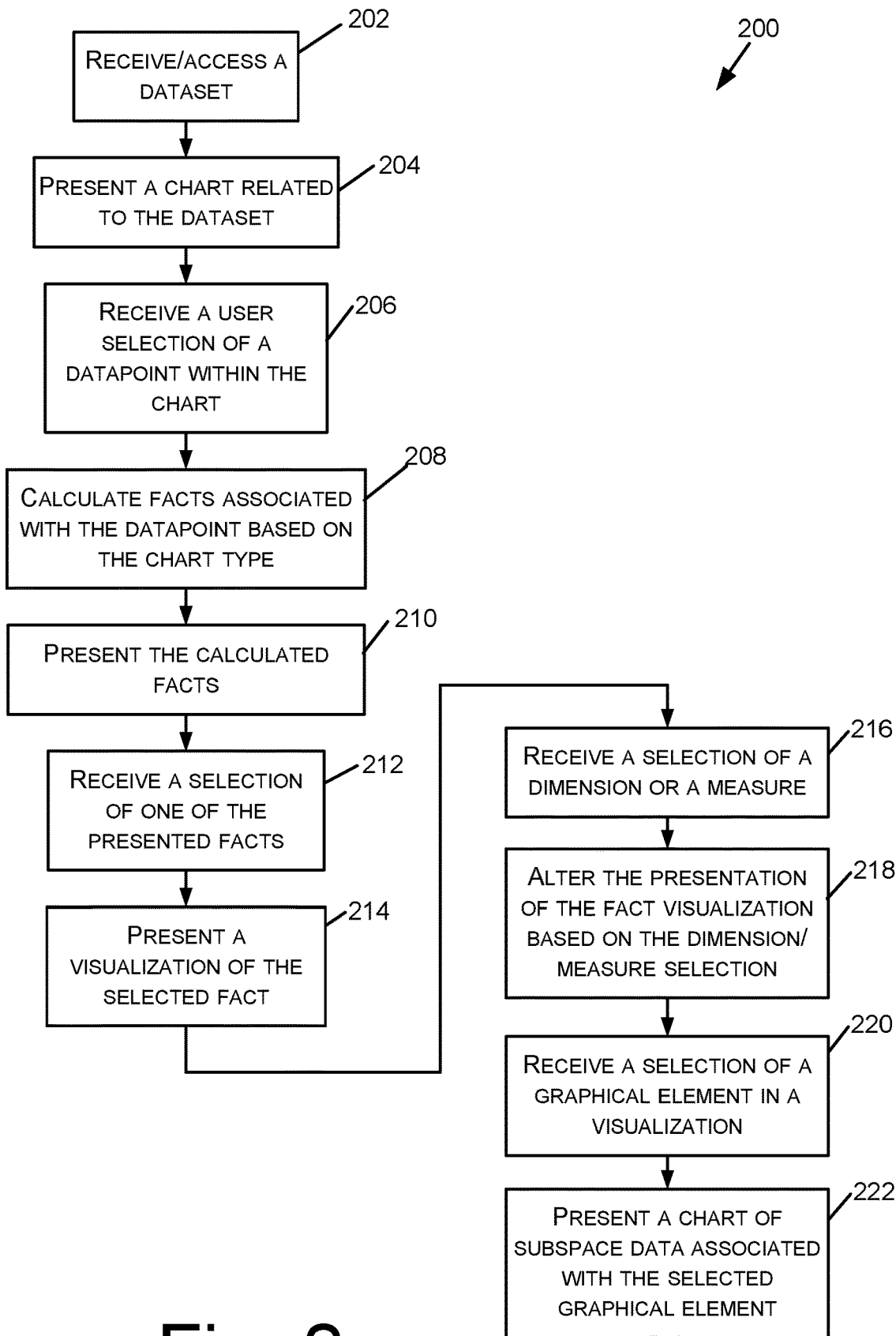
FIG. 2 is a flow chart of an example method for providing an interactive experience regarding datasets of multi-dimensional data.

Turning now to the flowchart of FIG. 2, aspects of data interaction for providing a more effective data interacting tool are shown.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their entirety. Some or all operations of the methods, and/or substantially equivalent operations, can be performed by execution of computer-readable instructions included on a computer-storage media, as defined below. The term "computer-readable instructions," and variants thereof, as used in the description and claims, are used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, the logical operations described herein are implemented (1) as a sequence of computer-implemented acts or program modules running on a computing system and/or (2)

as interconnected machine logic circuits or circuit modules within the computing system. The implementation is dependent on the performance and other requirements of the computing system. Accordingly, the logical operations described herein are referred to variously as states, operations, structural devices, acts, or modules. These operations, structural devices, acts, and modules may be implemented in software, in firmware, in special-purpose digital logic, and in any combination thereof.

With reference to FIG. 2, aspects of a routine 200 are shown for providing an interactive experience with charts or tables and data point calculations related to a dataset of multi-dimensional data. First, at operation 202, a dataset is received or accessed. Multiple datasets may be accessed. The multi-dimensional data structure may be stored at the data store 104 or at another remote storage location. The processor 108 may identify datasets of the multi-dimensional data structure that are available for exploration. The processor 108 may present the available datasets in an interface, such as a webpage, accessible by the user computing device 102. A user operating the user interface 122 on the user computing device 102 controls a cursor or other display tool to identify an available dataset of a multi-dimensional data structure that the user desires to explore.

At operation 204, a GUI related to the received dataset is presented to a user on the display device 120 of the user computing device 102. The interface module 112 generates the GUI. The GUI may include an exploration space that presents a chart of the dataset and components for selecting dimension or measure limiters to apply to the presented chart. The selectable dimension or measure limiters relate to dimensions or measures associated with the dataset in the presented chart.

Next, at operation 206, the interface module 112 receives, via the user interface 122 and the network interface 124 of the user computing device 102, a selection of a data point located within the presented chart. In one example, the selection is made by a cursor activation of a graphical element (i.e., data point) of the chart, whereby the graphical element is linked to a subspace of data in the dataset associated with the chart. This is shown by example in FIG. 3A.

At operation 208, in response to the data point selection, the interface module 112 calculates facts associated with the data point. The calculations are based on the chart type. The following are example charts: line chart; column chart; pie chart; or difference from previous (DiffFromPrev) chart. The following are examples of calculations that are applied to data points in a dataset included in the example charts. Other charts and associated calculations may be used.

Line chart:
difference of data point (i.e., associated subspace data) from a previous data point value (DiffFromPrev);
difference of data point from a first data point value in the dataset (DiffFromFirst);
difference of data point from a last data point value in the dataset (DiffFromLast);
difference of data point from an average data point value of comparable data points in the dataset (DiffFromAvg);
difference of data point from a minimum value of comparable data points in the dataset (DiffFromMin);
difference of data point from a maximum value of comparable data points in the dataset (DiffFromMax);
rank relative to comparable data points in the dataset (Rank); and
percentage of data point relative to all comparable data points in the dataset (Percentage).

Column chart:
Rank;
Percentage;
DiffFromAvg;
DiffFromMin; and
DiffFromMax.
Pie chart:
Percentage;
Rank;
DiffFromAvg;
DiffFromMin; and
DiffFromMax.
DiffFromPrev chart:
Rank;
DiffFromAvg;
DiffFromMin; and
DiffFromMax.

Figure 3A:
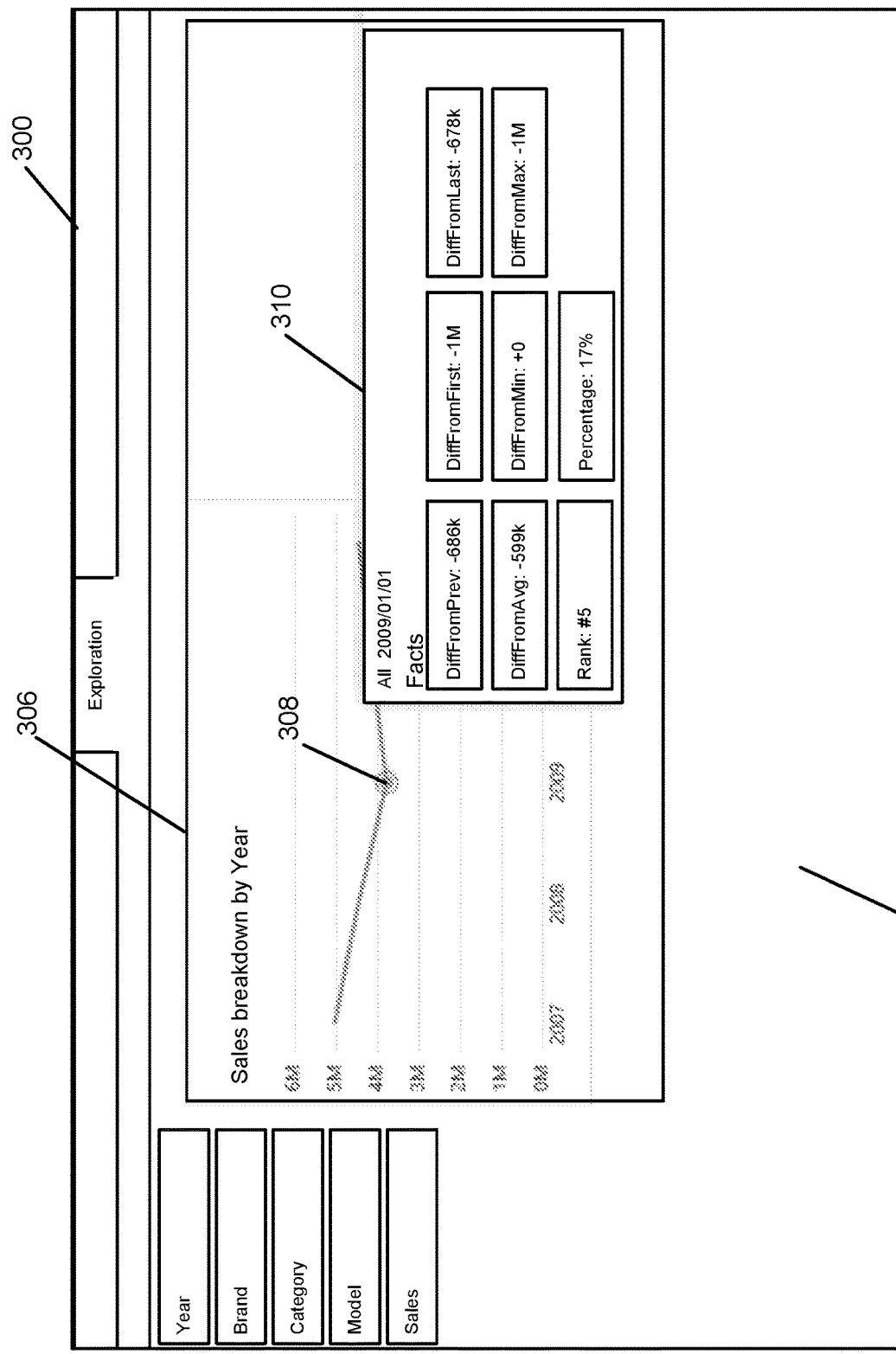
FIG. 3A shows a screen shot of an example interactive interface for presenting calculated facts related to information selected on a presented chart.

Then, at operation 210, the calculated facts are presented to a user on the display device 120 of the user computing device 102. The calculated facts may be presented in a separate page or window within the GUI. FIG. 3A shows one example way that facts are presented.

At operation 212, the interface module 112 receives, via the user interface 122 and the network interface 124 of the user computing device 102, a selection of one of the presented calculated facts. In one example, the selection is made by a cursor activation of a graphical element associated with the calculated fact and dragging the graphical element to the exploration space of the GUI, whereby the user deactivates the cursor. In other words, a drag and drop operation is used. Other methods of selection may be performed, such as by dropdown menus, voice actuation, for example.

Then, at operation 214, in response to the selection performed at operation 212, a visualization associated with the calculated fact is presented in a separate location of the exploration space. In one example, the user deactivating the cursor initiates the presentation of the visualization.

At operation 216, the interface module 112 receives, via the user interface 122 and the network interface 124 of the user computing device 102, a selection of a dimension limiter or a measure limiter presented in a dimension/measure section, pull-down menu or other location within the GUI. The selection of the dimension or measure limiters may include a drag drop operation. The drag drop operation includes the user of the user interface 122 activating a cursor over a button in the dimension/measure section, whereby the button identifies the dimension or measure limiters the user desires to apply to the visualized calculated fact. Then, the user drags the cursor to an area of the exploration space associated with the calculated fact visualization. Next, the user deactivates the cursor, which causes a visual representation of the button to appear to drop on the calculated fact visualization.

Next, at operation 218, the interface module 112 alters the presentation of the visualization associated with the calculated fact in response to the dimension or measure limiter selection. The altering depends upon which dimension or measure limiter was selected. For example, a difference from previous year calculation can be expanded to identify the difference from previous year for each brand, if the brand limiter is selected. This is shown by example in FIG. 3C described below.

At operation 220, the interface module 112 receives, via the user interface 122 and the network interface 124 of the user computing device 102, a selection of a graphical element of a visualization. In one example, the selection may include a drag drop operation. The drag drop operation includes the user of the user interface 122 activating a cursor over the graphical element, then dragging the graphical element to the exploration space. Then, the user deactivates the cursor, which causes a visual representation of the graphical element to drop into the exploration space.

Then, at operation 222, in response to the graphical element selection, the interface module 112 generates a chart of subspace data associated with the selected graphical element. This is shown by example in FIG. 3D. The interactive tools described above and by example in the following figures result in more efficient/effective interaction with multi-dimensional data FIG. 3A shows a screen shot of an example graphical user interface (GUI) 300. The GUI 300 includes exploration space 302 and a set of dimension/measure buttons 304 within a window. In this example, a user has selected data point 308 for year 2009 on a sales breakdown by year chart 306 presented in exploration space 302 adjacent to dimension/measure buttons 304.

After the user selects a data point "2009" on the line chart of sales breakdown by year, fact panel 310 automatically pops up over chart 306. The fact panel 310 lists a set of suggested calculation results for the selected data point. Each calculation is represented as a "Calculation Type: Calculation Result" text line. Other formats may be used. The calculation types include, but not limited to: Difference, Rank, Percentage, etc. Because the X-axis of the chart 306 is a temporal dimension ("Year"), the following calculations are performed: how the sales value in 2009 changes compared with the previous one ("2008"), the average value, the min/max values, and the first/last ones; how the sales value in 2009 contributes to the total sales; and how the sales value in 2009 ranks among all years.

Figure 3B:
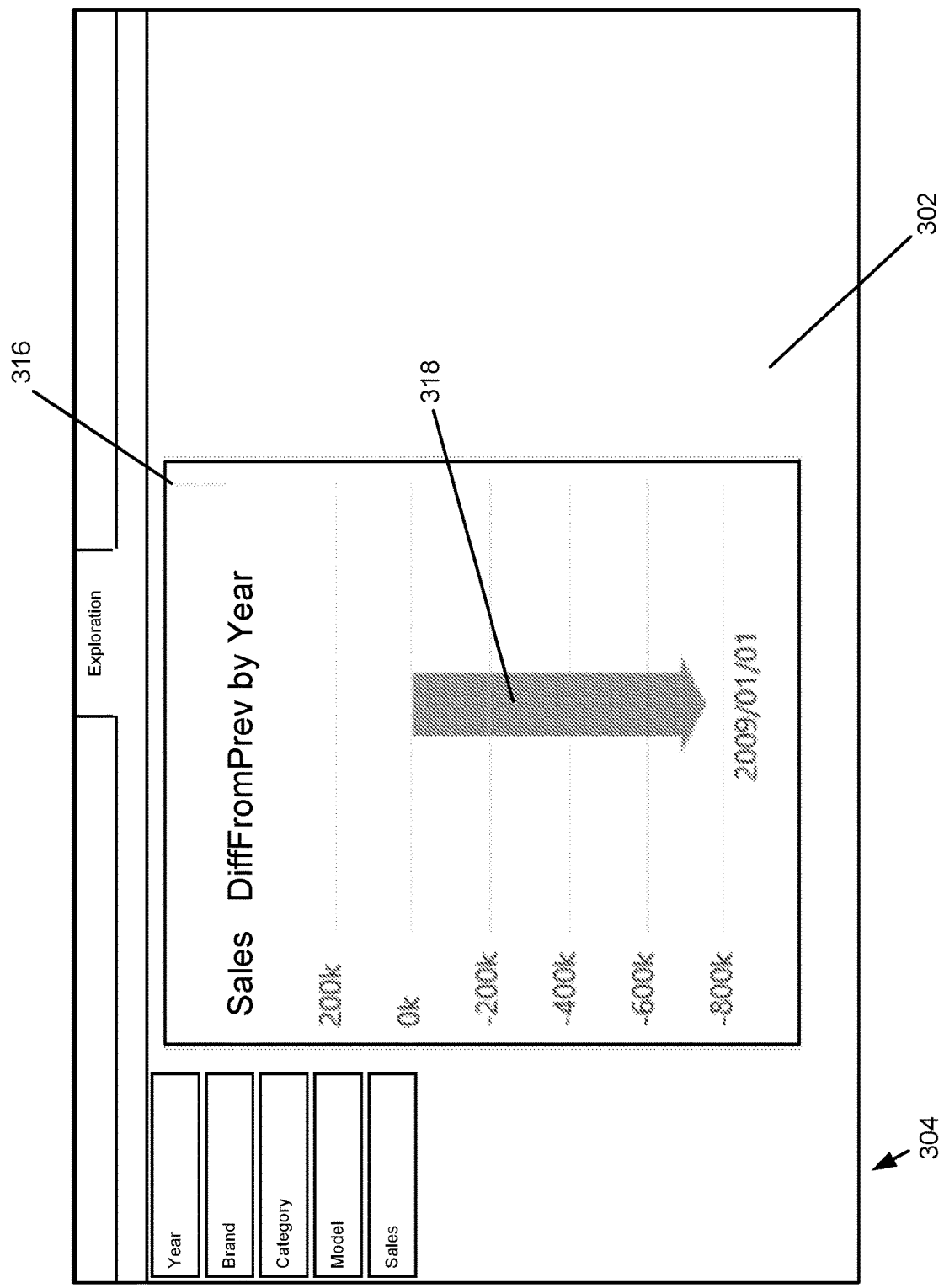
FIG. 3B shows a screen shot of an example interface chart resulting from a fact selection from the interactive interface shown in FIG. 3A.
Figure 4:
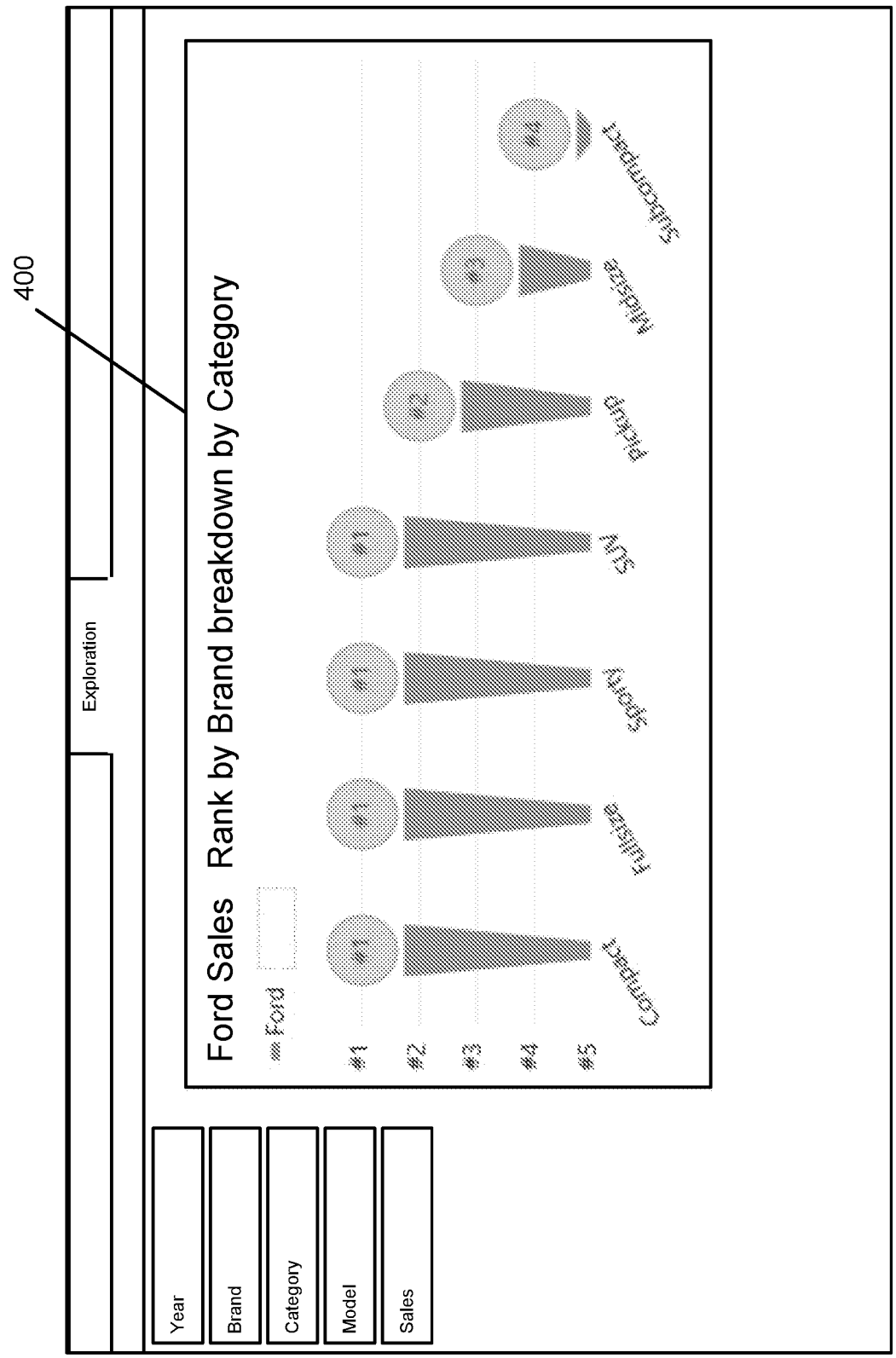
FIG. 4 shows a screen shot of an example interface resulting from a selection of a rank calculation limited by a category dimension associated with a dataset.
Figure 5:
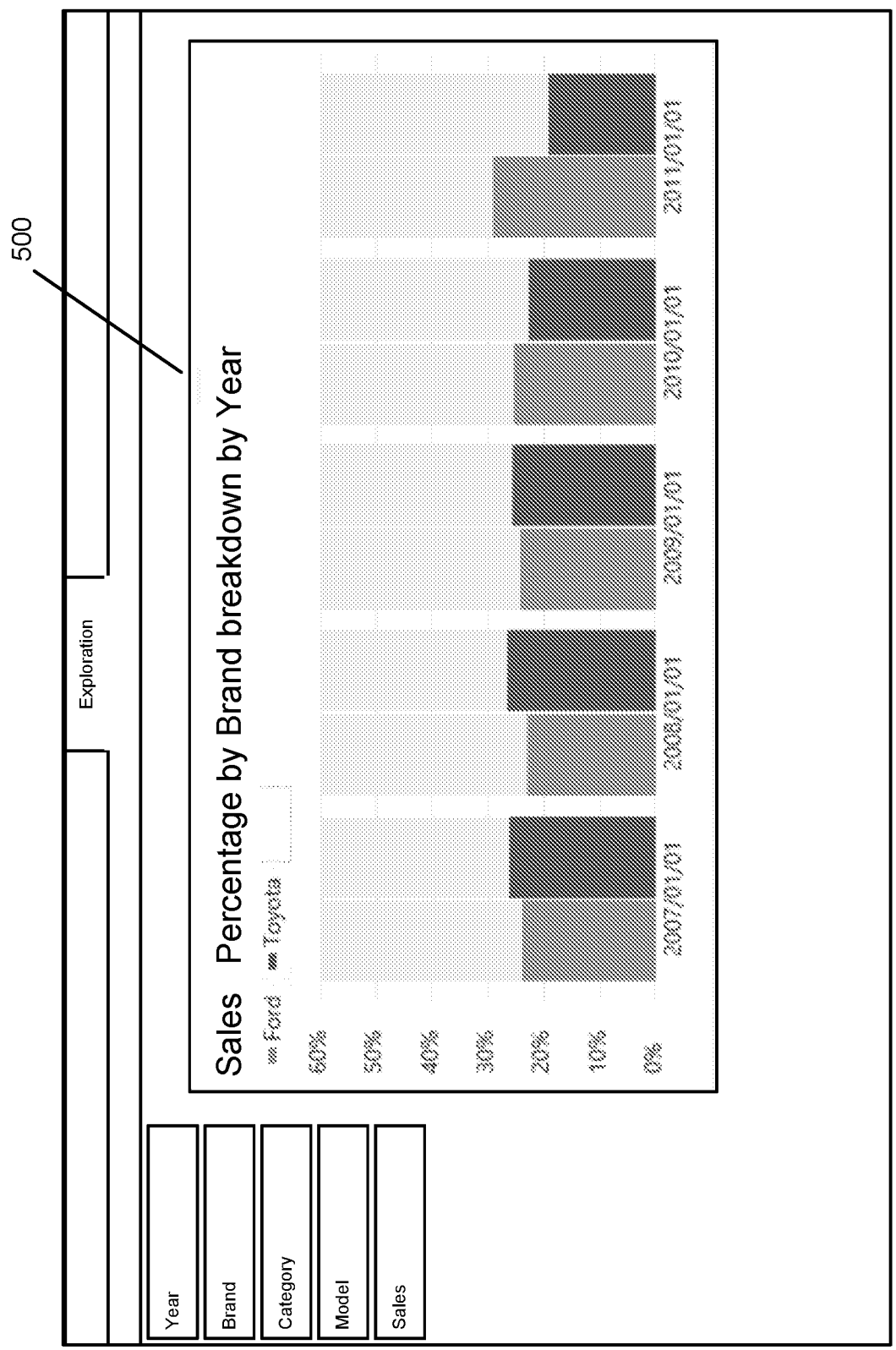
FIG. 5 shows a screen shot of an example interface resulting from a selection of a rank calculation limited by a year dimension.

FIG. 3B shows a chart 316 produced after the user has selected the DifffromPrev fact shown in fact panel 310. In one implementation, the DifffromPrev fact can be dragged out to exploration space 302 to create the new visualization chart 316. Because chart 316 is a difference calculation a specific visualization for the calculation is shown. The specific visualization in this example includes adding an arrow to graphical element 318 of the calculated result of the DifffromPrev fact. Directed columns (i.e., arrows) are used to intuitively represent the semantics of either increasing or decreasing. Other specific visualizations that highlight the calculation semantics of the associated calculation are shown in FIGS. 4 and 5.

Figure 3C:
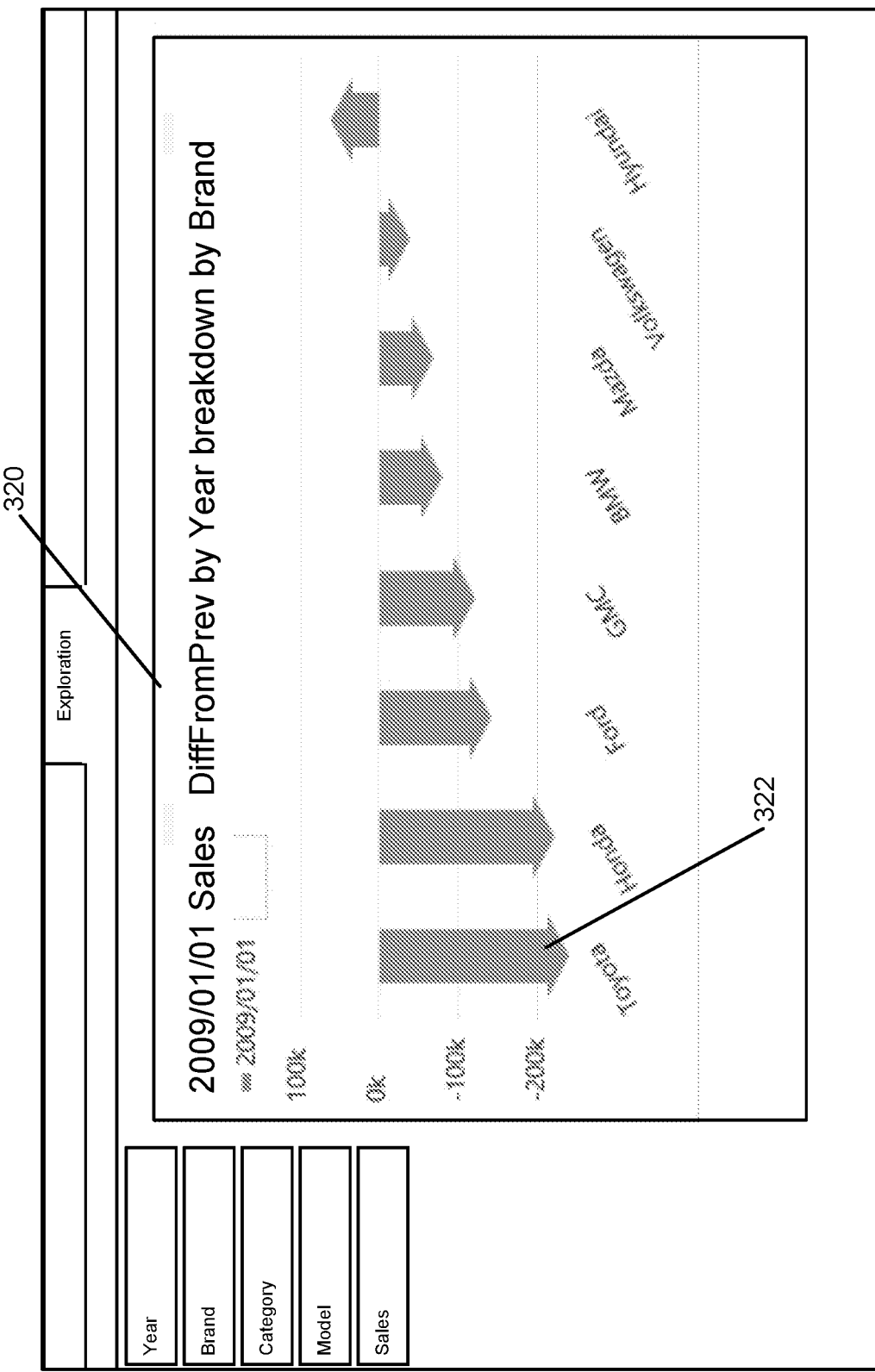
FIG. 3C shows a screen shot of an example interface resulting from a dimension or measure selection applied to the interface chart shown in FIG. 3B.

FIG. 3C shows chart 320 after selection of a button from the group of dimension/measure buttons 304 relative to the calculation shown in FIG. 3B. In this example, the user dragged the dimension limiter "Brand" onto chart 316 to breakdown the calculation result by "Brand." Chart 320 shows the "DiffFromPrev" calculation results for each car brand. Each bar in chart 320 represents the change number of the sales in 2009 compared to the sales in 2008 for a given car brand. This visualization allows the user to see that Toyota® sales declined the most in 2009 among all car brands—see "Toyota®" column 322.

Figure 3D:
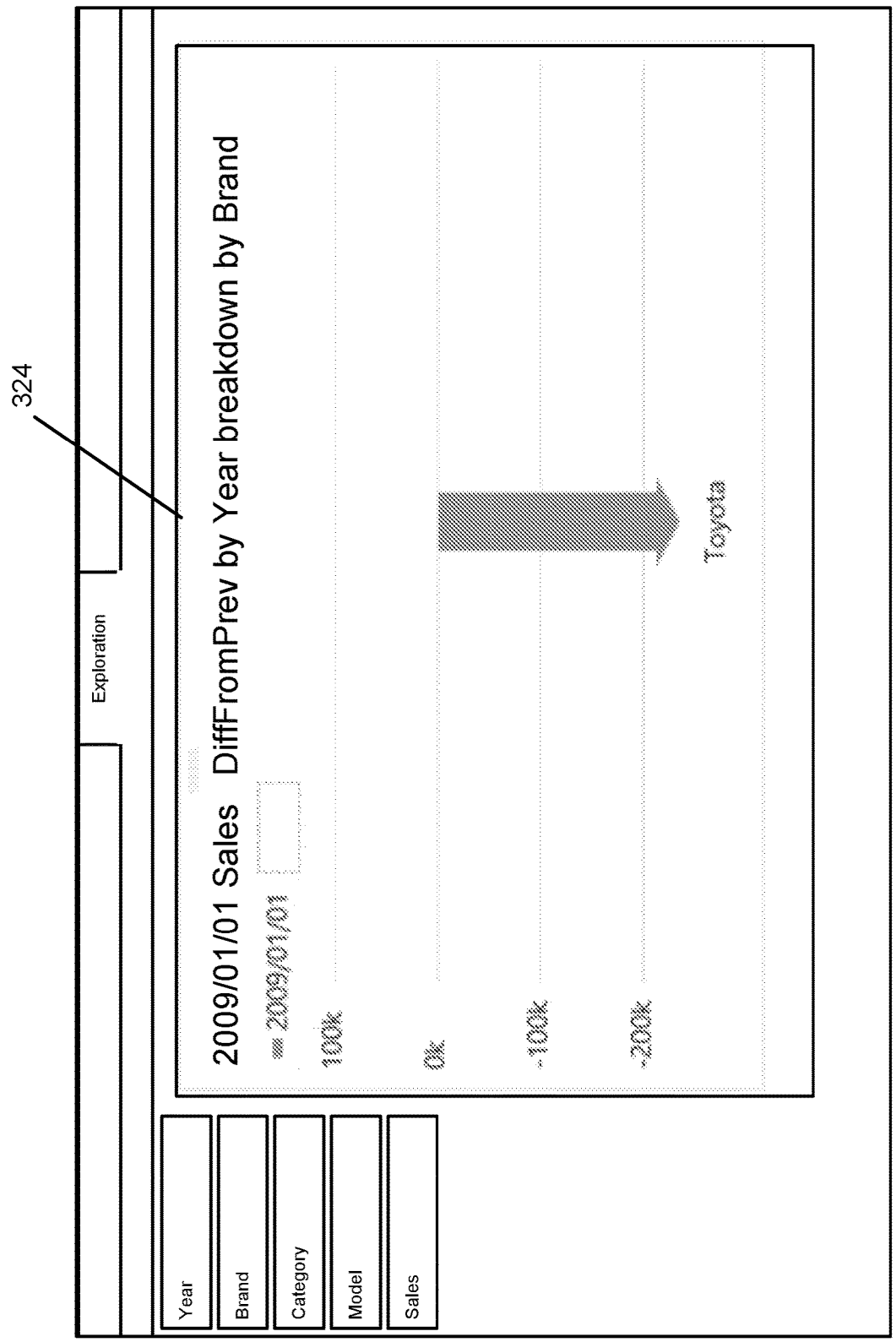
FIG. 3D shows a screen shot of an example interface resulting from a selection of a visual component of the interactive chart shown in FIG. 3C.

As shown in FIG. 3D, the user has dragged out the "Toyota®" column 322 from chart 320 (FIG. 3C) to exploration space 302. This action creates new visualization chart 324. Chart 324 only includes the DifffromPrev for Toyota®, which corresponds to "Toyota®" column 322 (FIG. 3C).

Figure 3E:
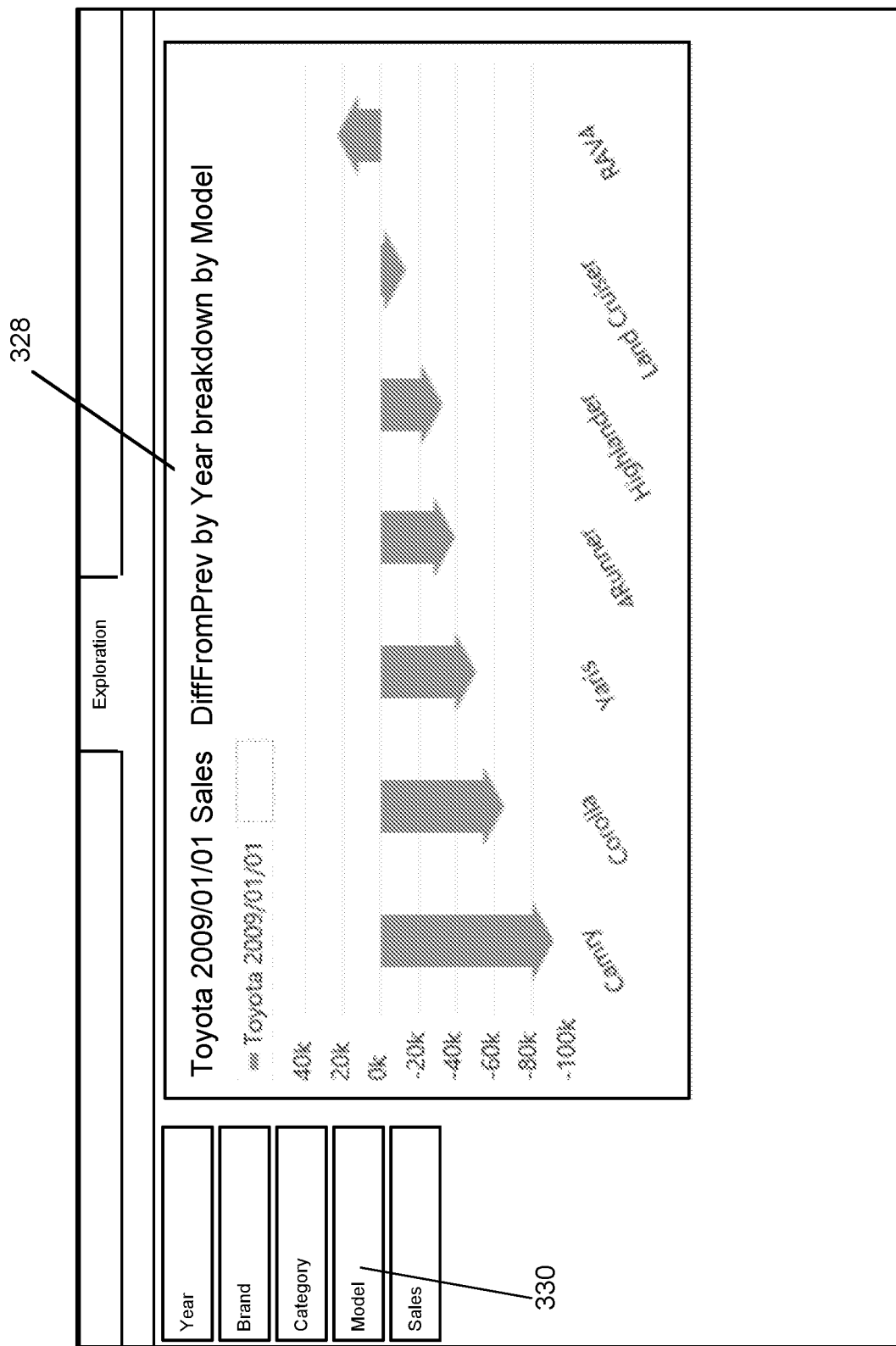
FIG. 3E shows a screen shot of an example interface resulting from a selection of a dimension or a measure applied to the interactive chart shown in FIG. 3D.

FIG. 3E shows new visualization chart 328 created in response to the user dragging the "Model" dimension limiter button 330 onto visualization chart 324. Chart 328 shows how sales differ from a previous year for each Toyota® model. In particular, visualization chart 328 shows that "Camry®" declines the most among all models of "Toyota®" cars.

Other specific visualizations for different types of calculations are presented in corresponding charts in order to highlight particular semantics of those calculations. FIG. 4 shows an example of specific visualization 400 for the rank calculation. Specific visualization 400 includes a rank value on a Y-axis. The rank value for each category of Ford® vehicles is shown with a circle on top of a pedestal sized according to its rank value. The rank value is displayed within the respective circle.

FIG. 5 shows an example specific visualization 500 for percentage calculation. Visualization 500 shows differently colored bars in a percentage scale. Each group of colored bars represents a specific value of the selected dimension, e.g., Brand. Visualization 500 shows market share of Toyota® cars and Honda® cars in each year.

Figure 6:
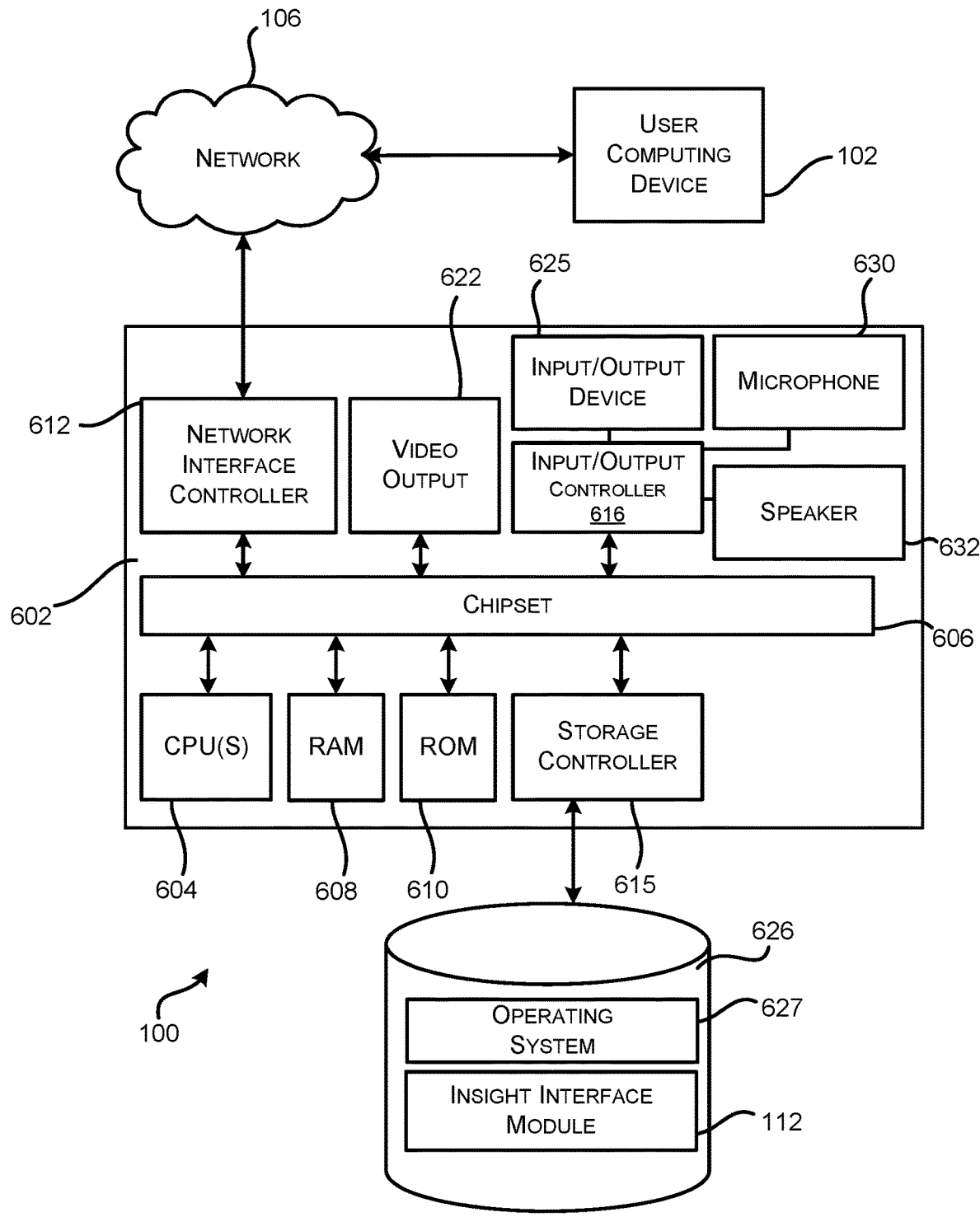
FIG. 6 is a block diagram of an example business intelligent computing device and remote user computing device, usable to implement the operations shown in FIG. 2.

FIG. 6 shows additional details of an example computer architecture, for the components shown in FIG. 1, capable of executing the program components described above for providing insight interaction. The computer architecture shown in FIG. 6 illustrates a console, conventional server computer, workstation, desktop computer, laptop, tablet, phablet, network appliance, personal digital assistant (PDA), e-reader, digital cellular phone, or other computing device, and may be utilized to execute any of the software components presented herein. For example, the computer architecture shown in FIG. 6 may be utilized to execute any of the software components described above. Although some of the components described herein are specific to the BI computing device 100, it can be appreciated that such components, and other components, may be part of the user computing device 102.

The BI computing device 100 includes a baseboard 602, or "motherboard," which is a printed circuit board to which a multitude of components or devices may be connected by way of a system bus or other electrical communication paths. In one illustrative embodiment, one or more central processing units (CPUs) 604 operate in conjunction with a chipset 606. The CPUs 604 may be standard programmable processors that perform arithmetic and logical operations necessary for the operation of the BI computing device 100.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state, based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the BI computing device 100. The chipset 606 may further provide an interface to a computer-readable storage medium, such as a read-only memory (ROM) 610 or nonvolatile RAM (NVRAM) for storing basic routines that help to start up the BI computing device 100 and to transfer information between the various components and devices. The ROM 610 or NVRAM may also store other software components necessary for the operation of the BI computing device 100 in accordance with the embodiments described herein.

The BI computing device 100 may operate in a networked environment using logical connections to remote computing devices and computer systems through a network, such as the local area network 106. The chipset 606 may include functionality for providing network connectivity through a network interface controller (NIC) 612, such as a gigabit Ethernet adapter. The NIC 612 is capable of connecting the BI computing device 100 to other computing devices over the network 106. It should be appreciated that multiple NICs 612 may be present in the BI computing device 100, connecting the computer to other types of networks and remote computer systems. The network 106 allows the BI computing device 100 to communicate with remote services and servers, and the user computing device 102. In addition, as described above, the user computing device 102 may mirror and reflect data stored on the BI computing device 100 and host services that may provide data or processing for the techniques described herein.

The BI computing device 100 may be connected to a mass storage device 626 (e.g., the data store 104) that provides nonvolatile storage for the BI computing device 100. The mass storage device 626 may store system programs, application programs, other program modules, and data, which have been described in greater detail herein. The mass storage device 626 may be connected to the BI computing device 100 through a storage controller 615, connected to the chipset 606. The mass storage device 626 may consist of one or more physical storage units. The storage controller 615 may interface with the physical storage units through a serial attached SCSI (SAS) interface, a serial advanced technology attachment (SATA) interface, a fiber channel (FC) interface, or other type of interface for physically connecting and transferring data between computers and physical storage units. It should also be appreciated that the mass storage device 626, other storage media, and the storage controller 615 may include MultiMediaCard (MMC) components, eMMC components, secure digital (SD) components, PCI Express components, or the like.

The BI computing device 100 may store data on the mass storage device 626 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 626 is characterized as primary or secondary storage, and the like.

For example, the BI computing device 100 may store information at the mass storage device 626 by issuing instructions through the storage controller 615 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The BI computing device 100 may further read information from the mass storage device 626 by detecting the physical states or characteristics of one or more particular locations within the physical storage units.

In addition to the mass storage device 626 described above, the BI computing device 100 may have access to other computer-readable media to store and retrieve information, such as program modules, data structures, or other data. Thus, although the interface module 112, and other modules are depicted as data and software stored in the mass storage device 626, it should be appreciated that these components and/or other modules may be stored, at least in part, in other computer-readable storage media of the BI computing device 100. Although the description of computer-readable media contained herein refers to a mass storage device, such as a solid-state drive, a hard disk, or compact disk (CD)-ROM drive, it should be appreciated by those skilled in the art that computer-readable media can be any available computer storage media or communication media that can be accessed by the BI computing device 100.

Communication media include computer-readable instructions, data structures, program modules, or other data in a modulated data signal, such as a carrier wave or other transport mechanism and include any delivery media. The term "modulated data signal" means a signal that has one or more of its characteristics changed or set in a manner so as to encode information in the signal. By way of example, and not limitation, communication media include wired media, such as a wired network or direct-wired connection, and wireless media such as acoustic, RF, infrared, and other wireless media. Combinations of the any of the above should also be included within the scope of computer-readable media.

Computer storage media includes volatile and nonvolatile, removable, and non-removable media implemented in any method or technology for storage of information, such as computer-readable instructions, data structures, program modules, or other data. For example, computer media include, but are not limited to, RAM, ROM, erasable programmable ROM (EPROM), electrical EPROM (EEPROM), flash memory or other solid-state memory technology; CD-ROM, digital versatile disks (DVD), high definition (HD)-DVD, BLU-RAY, or other optical storage; magnetic cassettes, magnetic tape, magnetic disk storage, or other magnetic storage devices; or any other medium that can be used to store the desired information and which can be accessed by the BI computing device 100. For purposes of the claims, the phrase "computer storage medium," and variations thereof, do not include waves or signals per se and/or communication media.

The mass storage device 626 may store an operating system 627 utilized to control the operation of the BI computing device 100. According to one embodiment, the operating system comprises the Windows® operating system from Microsoft Corporation. According to further embodiments, the operating system may comprise the UNIX, Android, Windows Phone or iOS operating systems, available from their respective manufacturers. It should be appreciated that other operating systems may also be utilized. The mass storage device 626 may store other system or application programs and data utilized by the BI computing device 100, such as the interface module 112, and/or any of the other software components and data described above. The mass storage device 626 might also store other programs and data not specifically identified herein.

In one embodiment, the mass storage device 626 or other computer-readable storage media are encoded with computer-executable instructions, which, when loaded into the BI computing device 100, transform the computer from a general-purpose computing system into a special-purpose computer capable of implementing the embodiments described herein. These computer-executable instructions transform the BI computing device 100 by specifying how the CPUs 604 transition between states, as described above.

According to one embodiment, the BI computing device 100 has access to computer-readable storage media storing computer-executable instructions, which, when executed by the BI computing device 100, perform the various routines described above with regard to FIG. 2 and the other figures. The BI computing device 100 might also include computer-readable storage media for performing any of the other computer-implemented operations described herein.

The BI computing device 100 may also include one or more input/output controllers 616 for receiving and processing input from a number of input devices, such as a keyboard, a mouse, a microphone, a headset, a touchpad, a touch screen, an electronic stylus, or any other type of input device. Also shown, the input/output controllers 616 are in communication with an input/output device 625. The input/output controller 616 may provide output to a display, such as a computer monitor, a flat-panel display, a digital projector, a printer, a plotter, or other type of output device. The input/output controller 616 may provide input communication with other devices such as a microphone 630, a speaker 632, game controllers, and/or audio devices. In addition, or alternatively, a video output 622 may be in communication with the chipset 606 and operate independent of the input/output controllers 616. It will be appreciated that the BI computing device 100 may not include all of the components shown in FIG. 6, may include other components that are not explicitly shown in FIG. 6, or may utilize an architecture completely different from that shown in FIG. 6.

EXAMPLE CLAUSES

A: A method comprising: retrieving, at a computing device, a dataset comprising a plurality of subspaces of multi-dimensional data; causing presentation of the dataset in a graphical user interface (GUI); receiving a selection of a data point associated with the dataset; determining a plurality of calculations related to a value associated with the selected data point; and causing presentation of the plurality of calculations in a selectable visualization.

B: The method of A, further comprising: receiving a selection of one of the plurality of calculations; and causing presentation of a visualization of the one of the plurality of calculations.

C: The method of B, wherein the receiving of the selection of one of the plurality of calculations comprises: receiving a user input via the GUI; and receiving a user interface action of placing the one of the plurality of calculations in an exploration area of the GUI.

D: The method of B or C, wherein causing presentation of the visualization of the one of the plurality of calculations comprises: determining a semantic graphical feature in response to a type of the one of the plurality of calculations; and causing presentation of the semantic graphical feature.

E: The method of B, C or D, further comprising: receiving a selection of a portion of the visualization of the one of the plurality of calculations; and causing presentation of a new visualization in response to receiving the selection of the portion of the visualization of the one of the plurality of calculations.

F: The method of E, wherein the receiving of the selection of the portion of the visualization of the one of the plurality of calculations comprises: receiving a user input via the GUI at a location associated with the portion of the visualization of the one of the plurality of calculations; and receiving a user interface action of placing the portion of the visualization of the one of the plurality of calculations in an exploration area of the GUI.

G: The method of B, C, D, E or F, further comprising: receiving a selection of one of a plurality of dimension or measure limiters; and causing presentation of a new visualization in response to receiving the selection of the one of the plurality of dimension or measure limiters.

H: The method of G, wherein the receiving of the selection of the one of the plurality of dimension or measure limiters comprises: receiving an activation of a cursor at a location associated with the one of a plurality of dimension or measure limiters; and receiving a user interface action of placing the one of a plurality of dimension or measure limiters in an area of the GUI associated with at least one of the visualization of the one of the plurality of calculations or the dataset.

I: The method of G, wherein the new visualization comprises a new chart, the method further comprising: receiving a selection of at least a portion of the new chart; determining a second plurality of calculations related to a value associated with the selected portion of the new chart; and causing presentation of the second plurality of calculations in a selectable visualization.

J: A computing apparatus comprising: a processor; and memory storing multi-dimensional data and instructions that, when executed by the processor, configure the apparatus to: retrieve a dataset from the stored multi-dimensional data; cause presentation of the dataset in a graphical user interface (GUI); receive a selection of a data point associated with the dataset; determine a plurality of calculations related to a value associated with the selected data point; and cause presentation of the plurality of calculations in a selectable visualization.

K: The computing apparatus of J, wherein the memory further comprises instructions that, when executed by the processor, configure the apparatus to: receive a selection of one of the plurality of calculations; determine one or more semantic graphical features in response to a type of the one of the plurality of calculations; and cause presentation of a visualization of the one of the plurality of calculations, wherein the visualization of the one of the plurality of calculations comprises the one or more semantic graphical features.

L: The computing apparatus of K, wherein the receiving of the selection of one of the plurality of calculations comprises: receiving a user input via the GUI; and receiving a user interface action of placing the one of the plurality of calculations in an exploration area of the GUI.

M: The computing apparatus of K or L, wherein the memory further comprises instructions that, when executed by the processor, configure the apparatus to: receive a selection of a portion of the visualization of the one of the plurality of calculations; and cause presentation of a new visualization in response to receiving the selection of the portion of the visualization of the one of the plurality of calculations.

N: The computing apparatus of M, wherein the receiving of the selection of the portion of the visualization of the one of the plurality of calculations comprises: receiving a user input via the GUI at a location associated with the portion of the visualization of the one of the plurality of calculations; and receiving a user interface action of placing the portion of the visualization of the one of the plurality of calculations in an exploration area of the GUI.

O: The computing apparatus of K, L, M or N, wherein the memory further comprises instructions that, when executed by the processor, configure the apparatus to: receive a selection of one of a plurality of dimension or measure limiters; and cause presentation of a new visualization in response to receiving the selection of the one of the plurality of dimension or measure limiters.

P: The computing apparatus of O, wherein the receiving of the selection of the one of the plurality of dimension or measure limiters comprises: receiving a user input via the GUI at a location associated with the one of a plurality of dimension or measure limiters; and receiving a user interface action of placing the one of a plurality of dimension or measure limiters in an area of the GUI associated with at least one of the visualization of the one of the plurality of calculations or the dataset.

Q: A system comprising: a processor; and memory storing multi-dimensional data and instructions that, when executed by the processor, configure the apparatus to: retrieve a dataset from the stored multi-dimensional data; cause presentation of the dataset in a graphical user interface (GUI); receive a selection of a data point associated with the dataset; determine a plurality of calculations related to a value associated with the selected data point; and cause presentation of the plurality of calculations in a selectable visualization.

R: The system of Q, wherein the memory further comprises instructions that, when executed by the processor, configure the apparatus to: receive a selection of one of the plurality of calculations; determine one or more semantic graphical features in response to a type of the one of the plurality of calculations; and cause presentation of a visualization of the one of the plurality of calculations, wherein the visualization of the one of the plurality of calculations comprises the one or more semantic graphical features.

S: The system of R, wherein the receiving of the selection of one of the plurality of calculations comprises: receiving a user input via the GUI; and receiving a user interface action of placing the one of the plurality of calculations in an exploration area of the GUI.

T: The system of R or S, wherein the memory further comprises instructions that, when executed by the processor, configure the apparatus to: receive a selection of a portion of the visualization of the one of the plurality of calculations; and cause presentation of a new visualization in response to receiving the selection of the portion of the visualization of the one of the plurality of calculations.

U: The system of T, wherein the receiving of the selection of the portion of the visualization of the one of the plurality of calculations comprises: receiving a user input via the GUI at a location associated with the portion of the visualization of the one of the plurality of calculations; and receiving a user interface action of placing the portion of the visualization of the one of the plurality of calculations in an exploration area of the GUI.

Based on the foregoing, it should be appreciated that technologies for providing action orchestration of computing entities in a complex network are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

The invention claimed is:

1. A method comprising:
retrieving, at a computing device, a dataset comprising a plurality of subspaces of multi-dimensional data;
causing presentation of a chart of the dataset in a graphical user interface (GUI);
receiving a selection of a data point in the chart;
determining a plurality of calculation options related to a value associated with the selected data point, wherein the plurality of calculation options are based on a type of the chart; and
in response to the selection of the data point, causing a popup of a visualization to be presented, wherein the visualization comprises the plurality of calculation options and the plurality of calculation options are selectable to present a second chart for a selected calculation option.

2. The method of claim 1, further comprising:
receiving a selection of one of the plurality of calculation options; and
causing presentation of the second chart.

3. The method of claim 2, wherein the receiving of the selection of one of the plurality of calculation options comprises:
receiving a user input via the GUI; and
receiving a user interface action of placing the one of the plurality of calculation options in an exploration area of the GUI.

4. The method of claim 2, wherein causing presentation of the visualization of the one of the plurality of calculation options comprises:
determining a semantic graphical feature in response to a type of the one of the plurality of calculation options; and
causing presentation of the semantic graphical feature.

5. The method of claim 2, further comprising:
receiving a selection of a portion of the visualization of the one of the plurality of calculation options; and
causing presentation of a new visualization in response to receiving the selection of the portion of the visualization of the one of the plurality of calculation options.

6. The method of claim 5, wherein the receiving of the selection of the portion of the visualization of the one of the plurality of calculation options comprises:
receiving a user input via the GUI at a location associated with the portion of the visualization of the one of the plurality of calculation options; and
receiving a user interface action of placing the portion of the visualization of the one of the plurality of calculation options in an exploration area of the GUI.

7. The method of claim 2, further comprising:
receiving a selection of one of a plurality of dimension or measure limiters; and
causing presentation of a new visualization in response to receiving the selection of the one of the plurality of dimension or measure limiters.

8. The method of claim 7, wherein the receiving of the selection of the one of the plurality of dimension or measure limiters comprises:
receiving an activation of a cursor at a location associated with the one of the plurality of dimension or measure limiters; and
receiving a user interface action of placing the one of the plurality of dimension or measure limiters in an area of the GUI associated with at least one of the visualization of the one of the plurality of calculation options or the dataset.

9. The method of claim 7, wherein the new visualization comprises a new chart, the method further comprising:
receiving a selection of at least a portion of the new chart;
determining a second plurality of calculations related to a value associated with the selected portion of the new chart; and
causing presentation of the second plurality of calculations in a selectable visualization.

10. A computing apparatus comprising:
a processor; and
memory storing multi-dimensional data and instructions that, when executed by the processor, configure the apparatus to:
retrieve a dataset from the stored multi-dimensional data;
cause presentation of the dataset in a graphical user interface (GUI);
receive a selection of a data point associated with the dataset;
determine a plurality of calculation options related to a value associated with the selected data point, wherein the plurality of calculation options are based on a presentation type; and
in response to the selection of the data point, cause a popup of a visualization to be presented, wherein the visualization comprises the plurality of calculation options, wherein the plurality of calculation options are selectable to present a chart for a selected calculation option.

11. The computing apparatus of claim 10, wherein the memory further comprises instructions that, when executed by the processor, configure the apparatus to:
receive a selection of one of the plurality of calculation options;
determine one or more semantic graphical features in response to a type of the one of the plurality of calculation options; and
cause presentation of a visualization of the one of the plurality of calculation options, wherein the visualization of the one of the plurality of calculation options comprises the one or more semantic graphical features.

12. The computing apparatus of claim 11, wherein the receiving of the selection of one of the plurality of calculation options comprises:
receiving a user input via the GUI; and
receiving a user interface action of placing the one of the plurality of calculation options in an exploration area of the GUI.

13. The computing apparatus of claim 11, wherein the memory further comprises instructions that, when executed by the processor, configure the apparatus to:
receive a selection of a portion of the visualization of the one of the plurality of calculation options; and
cause presentation of a new visualization in response to receiving the selection of the portion of the visualization of the one of the plurality of calculation options.

14. The computing apparatus of claim 13, wherein the receiving of the selection of the portion of the visualization of the one of the plurality of calculation options comprises:
receiving a user input via the GUI at a location associated with the portion of the visualization of the one of the plurality of calculation options; and
receiving a user interface action of placing the portion of the visualization of the one of the plurality of calculation options in an exploration area of the GUI.

15. The computing apparatus of claim 11, wherein the memory further comprises instructions that, when executed by the processor, configure the apparatus to:
receive a selection of one of a plurality of dimension or measure limiters; and
cause presentation of a new visualization in response to receiving the selection of the one of the plurality of dimension or measure limiters, wherein the receiving of the selection of the one of the plurality of dimension or measure limiters comprises:
receiving a user input via the GUI at a location associated with the one of the plurality of dimension or measure limiters; and
receiving a user interface action of placing the one of the plurality of dimension or measure limiters in an area of the GUI associated with at least one of the visualization of the one of the plurality of calculation options or the dataset.

16. A system comprising:
a processor; and
memory coupled to the processor, the memory comprising computer executable instructions that, when executed by the processor, perform a method comprising:
retrieving, at a computing device, a dataset of multi-dimensional data;
causing presentation of a first chart of the dataset in a user interface;
receiving a selection of a data point in the first chart;
determining a plurality of calculation options related to a value associated with the selected data point in the first chart, wherein the plurality of calculation options are based on a type of the first chart; and
in response to the selection of the data point, causing a popup of a visualization to be presented, wherein the visualization overlays at least a portion of the first chart and comprises the plurality of calculation options, wherein the plurality of calculation options are selectable to present a second chart for a selected calculation option.

17. The system of claim 16, wherein the user interface causes presentation of the first chart in an exploration space that comprises components for selecting dimension or measure limiters to apply to the first chart.

18. The system of claim 17, the method further comprising:
receiving a selection of a calculation option of the plurality of calculation options; and
in response to receiving the selection of the calculation option, causing the second chart to be presented in the exploration space.

19. The system of claim 18, the method further comprising:
applying a dimension limiter to a second visualization, wherein the applying comprises:
selecting the dimension limiter from the user interface; and
performing a drag-drop operation of the dimension limiter onto the second visualization; and
in response to applying the dimension limiter to the second visualization, causing a third visualization corresponding to the selected dimension limiter to be presented in the exploration space.

20. The system of claim 16, wherein one or more of the plurality of calculation options corresponds to at least of:

a difference between the data point and another data point in the dataset;
a rank of the data point among other data points in the dataset; and
a percentage of the data point relative to other data points in the dataset.

\* \* \* \* \*